Dec. 29, 1964 L. GONDRY 3,163,264
JOINT FOR SECURING STRUCTURAL MEMBERS
Filed Dec. 13, 1960
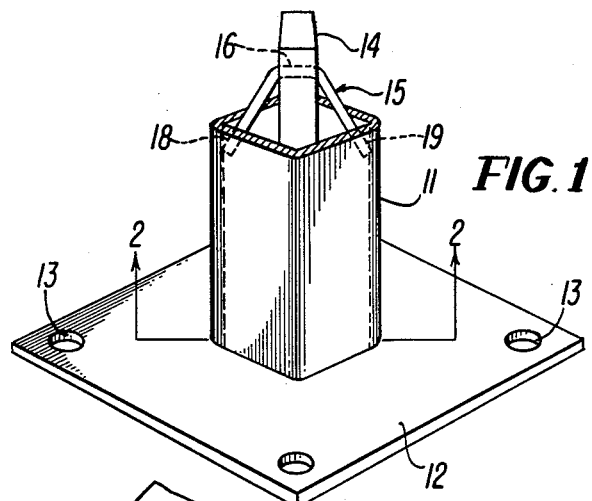
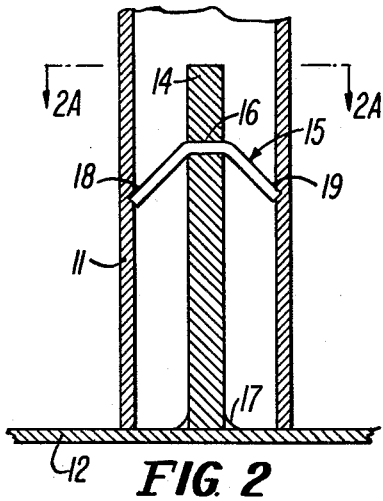
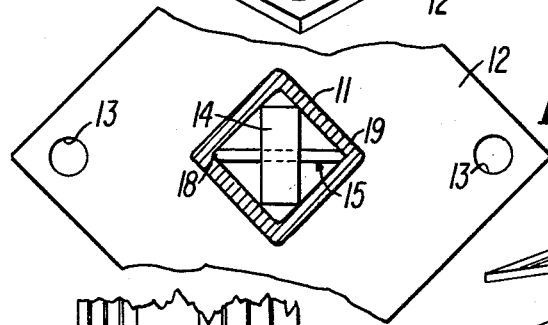
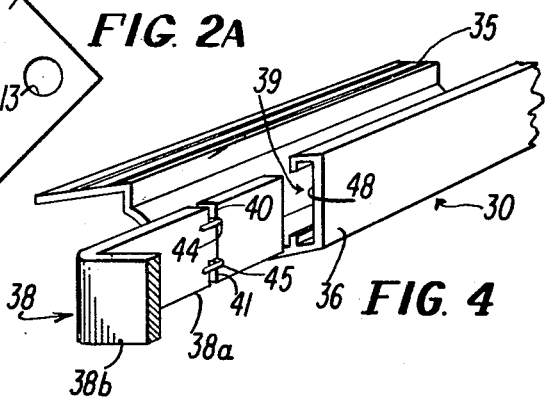
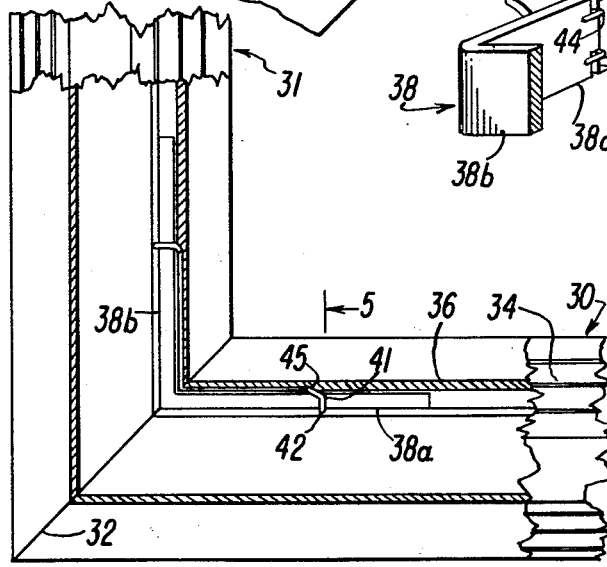
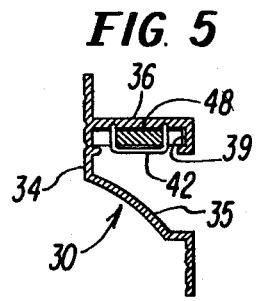
INVENTOR.
LOUIS GONDRY
BY
Wolfe, Hubbard Voit & Osann
ATTYS.

United States Patent Office 3,163,264
Patented Dec. 29, 1964

3,163,264
JOINT FOR SECURING STRUCTURAL MEMBERS
Louis Gondry, 215 W. 14th St., Danville, Ill.
Filed Dec. 13, 1960, Ser. No. 75,511
1 Claim. (Cl. 189—31)

This invention relates generally to structural joints and, more particularly, to a novel arrangement for effectively securing structural members together.

Structural members have usually been fastened one to another by screws, bolts, nails, wedging pieces and more recently by welding and fusing. Except for welding and fusing, each of which is expensive and complicated to accomplish, these other means of fastening structural members have not provided a structural joint which can withstand repeated shock treatment and varying load conditions efficiently. That is, such joints must be made heavier and reinforced extensively to maintain substantially their original alinement under these adverse operating conditions. Also each of these fastening means requires substantial access space during assembly of the joint so that a rotative motion, for example, where screws or bolts are used, or a pounding motion where nails or wedge pieces are used may be imparted to the fastening means.

It is an object of this invention to provide a structural joint which may be easily fabricated and can be assembled rapidly even by unskilled labor, yet maintains substantially its original alinement following repeated subjection to shock as well as to destructive stresses present in the normal use of the joint.

It is another object of the invention to provide a structural joint of great versatility which can be used to fasten structural members either in heavy or light structural work. A further object is to provide a joint for fastening structural members disposed at various angular positions to each other and requiring a relatively small access space to the joint.

Other objects and advantages of the present invention will become apparent upon reading the following detailed description and upon reference to the drawings in which:

FIGURE 1 is a perspective view of a joint embodying one aspect of the present invention;

FIG. 2 is a vertical sectional view, to a slightly enlarged scale, taken substantially along 2—2 in FIG. 1; and FIG. 2A is a horizontal sectional view through the joint, taken in the plane of the line 2A—2A in FIG. 2;

FIG. 3 is an elevation view of a different joint with a partial section removed and embodying another aspect of the present invention;

FIG. 4 is an exploded view of two interfitting structural members of the joint of FIG. 3; and FIG. 5 is a section taken substantially along the plan of the line 5—5 in FIG. 3.

While the invention will be described in connection with certain illustrative embodiments, it will be understood that there is no intention to limit the invention to such embodiments. On the contrary, it is intended to cover all modifications, alternatives, and equivalents within the spirit and scope of the invention as defined by the appended claim.

Turning to the drawings, one form of the present invention is exemplified in FIGS. 1, 2 and 2A comprising a tubular structural member or rail post 11 of polygonal cross section, in this case substantially a square, secured to an anchoring plate 12. The plate 12 in this instance happens to be constructed of steel, but it will be appreciated that other construction materials, such as wood, plastics, concrete and the like, can be used. As presently shown, the plate 12 would be attached by screws through apertures 13 to a floor or beam and the rail post 11 would extend upwardly therefrom. The structural joint is engaged by simply forcing the tubular rail post 11 over a second structural member in the form of a protruding lug 14 of rectangular cross-section anchored as by means of welded joint 17 to the plate 12 (FIG. 2).

In accordance with the present invention, a joint is formed of two interfitting structural members assembled together by substantially free slidable movement and retained in assembled condition by an interposed barb means which resists retrogressive movement tending to pull the members apart. This is accomplished in the present instance by the use of a transversely disposed locking element in the form of a spring wire 15 carried by the lug 14 and having a length somewhat greater than the diagonal of the inside cross-sectional shape of the tubular structural member in rail post 11 (FIGS. 1, 2 and 2A). The spring wire 15 is inserted in an aperture 16 in the lug with its two ends 18, 19 projecting or protruding beyond the aperture and directed downwardly toward the anchor plate 12. As the rail post 11 telescopes over the wire-carrying lug 14, the latter is disposed on one diagonal of the inside post cross section, slidably engaging the inner side walls of the post but precluding relative rotation between the post 11 and the lug 14. At the same time, the wire locking element 15 is disposed on the other diagonal of the inside post cross section, with the wire ends or protuberances 18, 19 engaging the same at diagonally opposed corners. Upon application of forces tending to separate the rail post and anchor plate, the wire locking element 15 is subjected to substantial compressive forces and its ends 18, 19 tend to penetrate the inner surface of the post 11 at the corners of its inside cross section. As long as the wire locking element withstands such forces and the ends 18, 19 do not puncture the longitudinal sides of the rail post 11, the structural members will not disassemble. Experiments have been conducted on a structural joint of the exemplary type and it has withstood a pulling force of 1000 pounds without disassembling. It is also apparent from the description and drawings that enclosure of the barb means 15 within the rail post 11 protects it against accidental disengagement as well as against deterioration due to exposure.

Another exemplary form of the present invention is disclosed in FIGS. 3, 4 and 5. Herein is shown a corner joint formed of two structural frame members 30, 31, as commonly encountered in constructions of sashes for storm windows and doors, frames for mirrors and pictures, and the like.

Moldings 30 and 31 are alike, each having a face side 34 generally defined by a plurality of lateral surfaces and an arcuate surface all integral, and a backside 35 having an integral channeled rib 36 extending therefrom. It is suggested that the molding can be formed of aluminum extruded into the desired configuration. It, however, is understood that other materials such as steel, plastics and the like can also be used.

The moldings 30, 31 are held together by a retainer connector or corner bracket 38. The bracket 38 is made of two legs 38a, 38b, of which leg 38b is held in molding 31, and leg 38a extends from the mitered end of the molding 31 and is adapted to fit into the channel or socket 39 of molding 30 to form after assembly a smooth abutting joint 32. The two moldings have been preferably mitered so that a right angle joint is formed, it however is clear that the moldings can be cut to adjoin at smaller or larger angles than 90 degrees.

For retaining the structural members in assembled condition as taught by the present invention, the leg 38a of the connector or retainer bracket 38 is provided with apertures 40, 41 through which a wire staple 42 is fitted, the latter having extending end portions 44, 45 bent oppositely to the direction of engaging movement of the leg 38a and the receiving channel 39 of the molding 30. The extending end portions or protuberances 44, 45 lie along a bracket longitudinal surface 46 which is juxtaposed the channel inner surface 48. Upon sliding engagement of the bracket leg and channel the wire staple ends bite into the channel inner surface 48 so that a force directed to disassemble the joint will put the staple end portions 44, 45 into compression, thereby holding the joint fast and precluding any movement apart of the molding piece 30 and the connector bracket leg 38a. This type of joint is particularly capable of withstanding slamming loads such as in drive-in serve out windows or storm doors. Though, illustratively, there are shown two ends 44, 45 of the wire staple 42 biting into the channel surface 48, it, however, is within the full teachings of the invention to use only one wire end portion to achieve the same type of joint.

The above has been an explanation for assembling the molding piece 30 and connector bracket leg 38a. To assemble the molding piece 31 and the connector bracket leg 38b, exactly the same type of structure and assembling steps are involved with the bracket leg 38b fitting into a receiving channel in the molding 30. The biting engagement obtained from the wire staple ends is the same as was explained previously with the resulting rigid joint between the corner bracket leg 38b and the molding 31.

The usual fastening means of nails, screws, welds or the like is not required to secure two structural members in the exemplary corner joint. The sliding connection of the staple carrying connector bracket together with the channel provide the necessary rigid joint. Also, the fastening means are fully enclosed and the moldings 30, 31 abut exposing a smooth meeting of faces at the mitered joint.

It is clear from the foregoing description of the present invention that it is broadly applicable in the construction field and is particularly advantageous because prealined, neat appearing joints are obtained by following its teachings. Yet in achieving these refinements strength is not sacrificed, and the joints are capable of withstanding repeated shock without working loose.

I claim as my invention:

A joint for securing a pair of interfitting structural members in rigid assembly relation, said joint comprising, in combination, a first structural member of hollow tubular form with a polygonal cross section defining pairs of diagonally opposed corners, an anchoring plate, means for rigidly securing said anchoring plate to an appropriate support, a lug rigidly fixed to said anchoring plate and projecting outwardly therefrom, said lug and said anchoring plate together defining a second structural member, said lug and said first structural member being dimensioned and adapted to interfit telescopically with substantially free slidable movement and with said lug disposed along one diagonal of the cross section of said first structural member, a resilient locking element mounted on said lug and projecting transversely therefrom, said locking element being disposed along another diagonal of the cross section of said first structural member and having an overall length substantially greater than the length of said other diagonal, said locking element having end portions adapted to deflect toward said anchoring plate and to slidably engage the inner surface of said first structural member as the latter is slid telescopically over said lug toward said anchoring plate, said end portions of said locking element being constrained against pivotal movement and being adapted to bite into the inner surface of said first structural member upon application of an axial pulling force tending to separate said first structrual member from said lug and said anchoring plate, whereby separation of said structural members is precluded.

References Cited in the file of this patent
UNITED STATES PATENTS

| | | |
|---|---|---|
| 1,375,671 | Cerf | Apr. 26, 1921 |
| 1,462,761 | Kugler | July 24, 1923 |
| 2,101,349 | Sharp | Dec. 7, 1937 |
| 2,917,917 | Atkinson | Dec. 22, 1959 |